(12) United States Patent
Mayo et al.

(10) Patent No.: US 12,479,366 B2
(45) Date of Patent: Nov. 25, 2025

(54) 3D SKELETON DETECTION FOR IN-CABIN AUTOMOTIVE APPLICATION

(71) Applicant: Gentex Corporation, Zeeland, MI (US)

(72) Inventors: Bar Mayo, Rehovot (IL); Guy Raz, Binyamina (IL)

(73) Assignee: GENTEX CORPORATION, Zeeland, MI (US)

( * ) Notice: Subject to any disclaimer, the term of this patent is extended or adjusted under 35 U.S.C. 154(b) by 19 days.

(21) Appl. No.: 18/398,603

(22) Filed: Dec. 28, 2023

(65) Prior Publication Data

US 2024/0217440 A1 Jul. 4, 2024

Related U.S. Application Data

(60) Provisional application No. 63/436,168, filed on Dec. 30, 2022.

(51) Int. Cl.
*B60R 1/29* (2022.01)
*B60R 21/015* (2006.01)

(52) U.S. Cl.
CPC .......... *B60R 1/29* (2022.01); *B60R 21/01538* (2014.10); *B60R 2300/103* (2013.01); *B60R 2300/105* (2013.01); *B60R 2300/8006* (2013.01)

(58) Field of Classification Search
CPC .............. B60R 1/29; B60R 21/01538; B60R 2300/103; B60R 2300/105; B60R 2300/8006; B60R 21/01552; B60R 25/25
See application file for complete search history.

(56) References Cited

U.S. PATENT DOCUMENTS

| | | | | |
|---|---|---|---|---|
| 2002/0050924 A1* | 5/2002 | Mahbub | ................. | G01S 17/89 340/426.1 |
| 2004/0247158 A1* | 12/2004 | Kohler | ................... | G06V 20/64 348/E13.067 |
| 2005/0263992 A1* | 12/2005 | Matsuda | .............. | G06V 20/593 280/735 |
| 2006/0164228 A1* | 7/2006 | Tseng | ........................ | B60R 1/26 348/148 |
| 2009/0278915 A1* | 11/2009 | Kramer | ................. | G06F 3/0325 345/158 |
| 2012/0242795 A1* | 9/2012 | Kane | ..................... | H04N 13/211 348/46 |
| 2014/0282161 A1* | 9/2014 | Cash | ....................... | G06F 3/017 715/769 |
| 2014/0292665 A1* | 10/2014 | Lathrop | ................ | G06F 3/0416 345/173 |

(Continued)

*Primary Examiner* — James A Shriver, II
(74) *Attorney, Agent, or Firm* — Price Heneveld LLP; Brian James Brewer

(57) ABSTRACT

A monitoring system for a vehicle includes at least one imaging device configured to capture a first image type and a second image type in a sequence. A first illumination source is configured to emit a flood illumination captured by the at least one imaging device in the first image type. A second illumination source is configured to emit an illumination pattern captured by the at least one imaging device in the second image type. At least one processor is configured to extract a 2-dimensional ("2D") skeletal representation of a vehicle occupant from the first image type, measure a depth of the 2D skeletal representation with the second image type, and extrapolate a 3-dimensional ("3D") skeletal representation of the vehicle occupant.

20 Claims, 10 Drawing Sheets

(56) References Cited

U.S. PATENT DOCUMENTS

| | | | |
|---|---|---|---|
| 2015/0175172 A1* | 6/2015 | Truong | G10L 25/48 |
| | | | 701/36 |
| 2016/0185293 A1* | 6/2016 | Gieseke | G06F 3/017 |
| | | | 348/115 |
| 2018/0196998 A1 | 7/2018 | Price et al. | |
| 2019/0073040 A1 | 3/2019 | Luchner et al. | |
| 2021/0064147 A1 | 3/2021 | Arora et al. | |
| 2021/0264627 A1 | 8/2021 | Xu et al. | |
| 2022/0118932 A1 | 4/2022 | Lee | |

* cited by examiner

3D SKELETON DETECTION FOR IN-CABIN AUTOMOTIVE APPLICATION

CROSS-REFERENCE TO RELATED APPLICATION

This application claims priority to and the benefit under 35 U.S.C. § 119(e) of U.S. Provisional Application No. 63/436,168, filed on Dec. 30, 2022, entitled "3D SKELETON DETECTION FOR IN-CABIN AUTOMOTIVE APPLICATION," the disclosure of which is hereby incorporated herein by reference in its entirety.

FIELD OF THE DISCLOSURE

The present disclosure generally relates to a monitoring system, and more particularly to a monitoring system configured to extrapolate a 3-dimensional ("3D") skeletal representation of a vehicle occupant.

SUMMARY OF THE DISCLOSURE

According to one aspect of the present disclosure, a monitoring system for a vehicle includes at least one imaging device configured to capture a first image type and a second image type in a sequence. A first illumination source is configured to emit a flood illumination captured by the at least one imaging device in the first image type. A second illumination source is configured to emit an illumination pattern captured by the at least one imaging device in the second image type. At least one processor is configured to extract a 2-dimensional ("2D") skeletal representation of a vehicle occupant from the first image type, measure a depth of the 2D skeletal representation with the second image type, and extrapolate a 3-dimensional ("3D") skeletal representation of the vehicle occupant.

According to another aspect of the present disclosure, a monitoring system for a vehicle includes at least one imaging device configured to capture a first image type and a second image type. The first image type includes a 2-dimensional ("2D") capture of a flood illumination on a vehicle occupant. The second image type includes a depth information of the vehicle occupant. At least one processor is configured to extract a 2-dimensional ("2D") skeletal representation of a vehicle occupant from the first image type, measure a depth of the 2D skeletal representation with the depth information, and extrapolate a 3-dimensional ("3D") skeletal representation of the vehicle occupant. The at least one processor is further configured to detect when a hand of the 3D skeletal representation of the vehicle occupant is in a gesture position, recognize a first hand gesture of the hand, and generate a menu in accordance with the first hand gesture.

According to yet another aspect of the present disclosure, a monitoring system for a vehicle includes at least one imaging device configured to capture a first image type and a second image type. The first image type includes a 2-dimensional ("2D") capture of a flood illumination on a vehicle occupant. The second image type includes a depth information of the vehicle occupant. At least one processor is configured to extract a 2-dimensional ("2D") skeletal representation of a vehicle occupant from the first image type, measure a depth of the 2D skeletal representation with the depth information, and extrapolate a 3-dimensional ("3D") skeletal representation of the vehicle occupant. The at least one processor is further configured to detect when a hand of the 3D skeletal representation of the vehicle occupant is in a gesture position within a threshold distance of the at least one imaging device, recognize a first hand gesture of the hand, and generate a menu on a full display rearview mirror assembly in accordance with the first hand gesture.

These and other features, advantages, and objects of the present disclosure will be further understood and appreciated by those skilled in the art by reference to the following specification, claims, and appended drawings.

DETAILED DESCRIPTION

Figure 1:
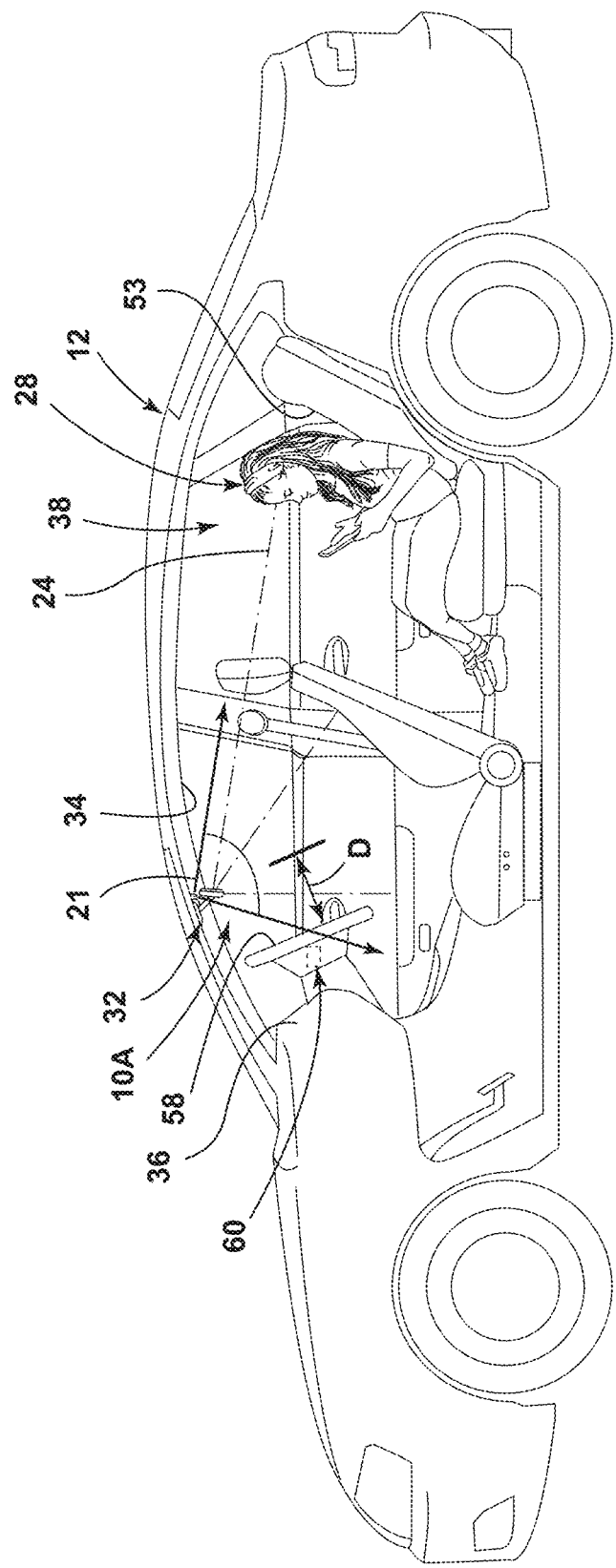
FIG. 1 is a side plan view of a vehicle that incorporates a monitoring system in a first construction in accordance with an aspect of the present disclosure.

The present illustrated embodiments reside primarily in combinations of method steps and apparatus components related to a monitoring system configured to extrapolate a 3-dimensional ("3D") skeletal representation of a vehicle occupant. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
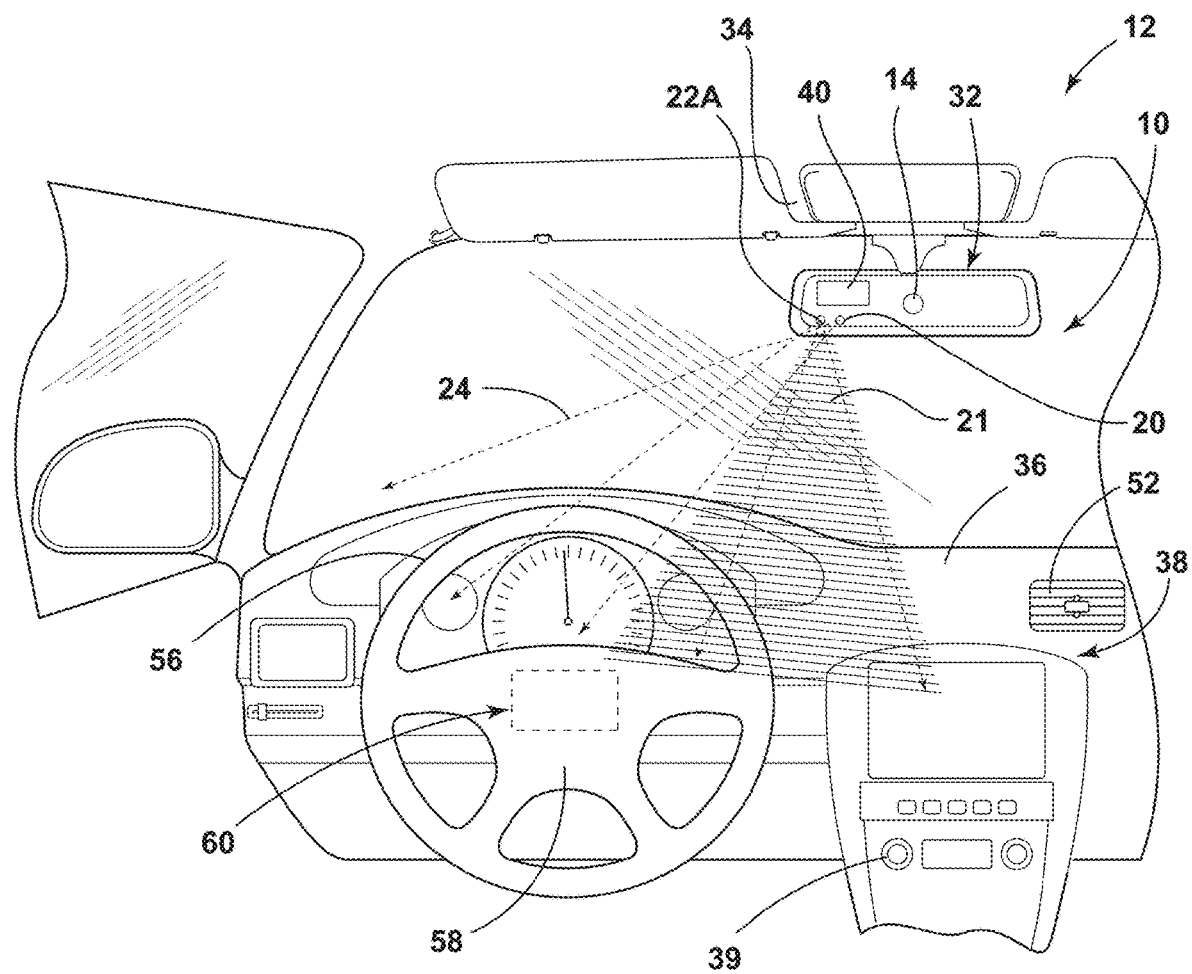
FIG. 2 is an interior view of a vehicle that incorporates a monitoring system in a first construction in accordance with an aspect of the present disclosure.
Figure 3:
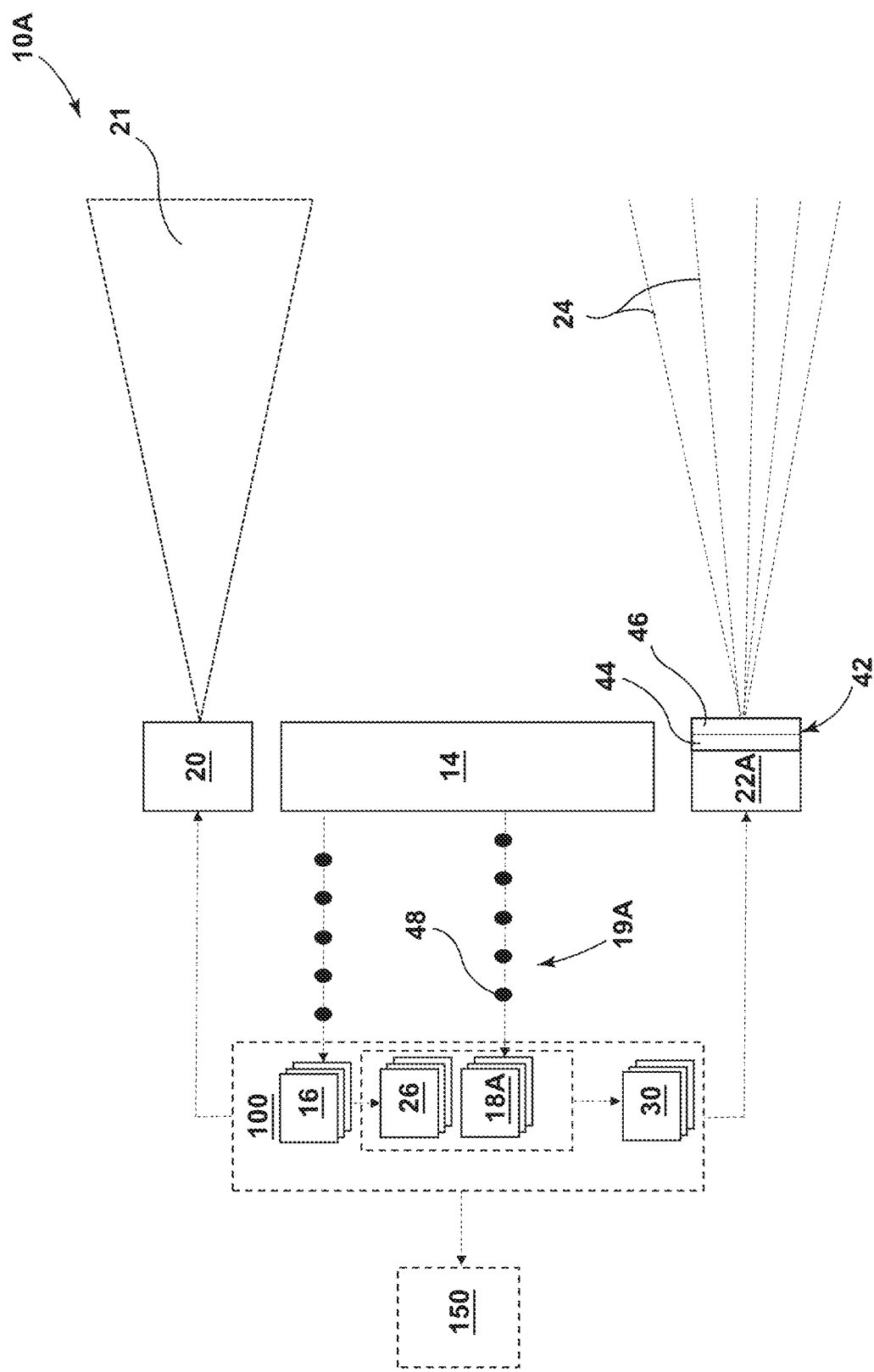
FIG. 3 is a schematic view of a monitoring system including a first construction in accordance with an aspect of the present disclosure.
Figure 4:
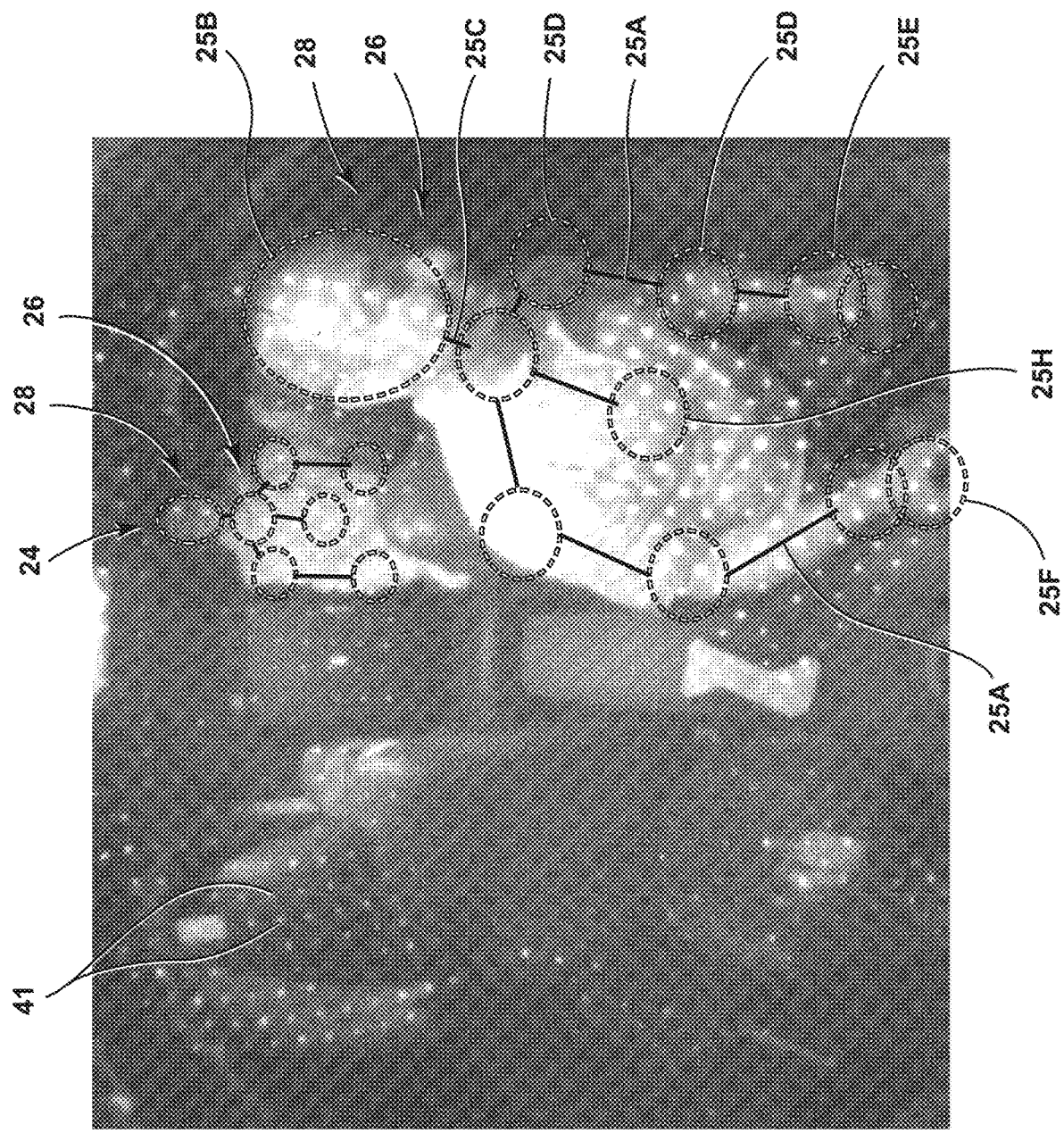
FIG. 4 illustrates a first image type overlaid over a second image type of a vehicle interior cabin that incorporates a monitoring system in accordance with an aspect of the present disclosure.
Figure 5:
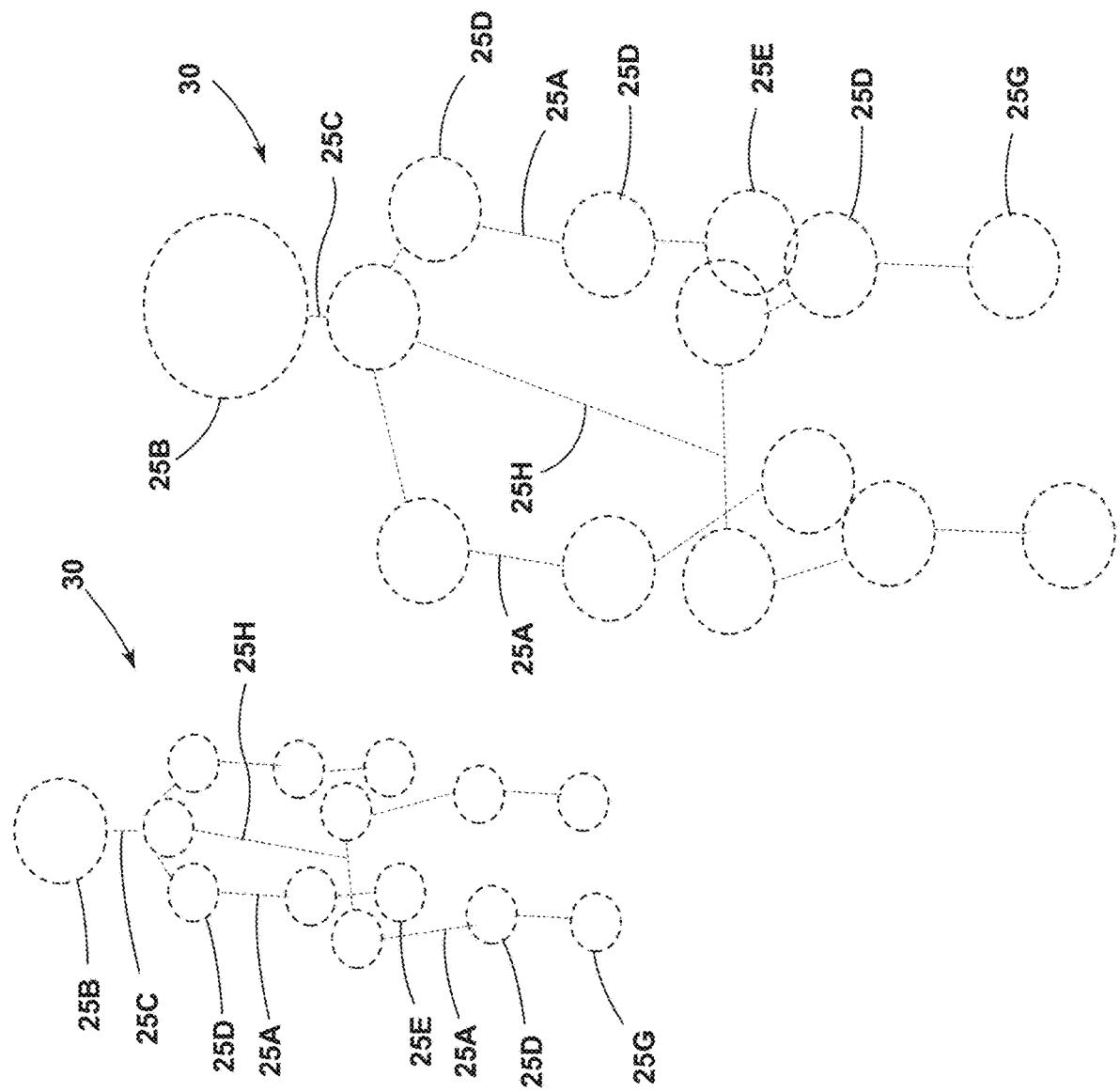
FIG. 5 is a schematic view of two 3-dimensional ("3D") skeletal representations of vehicle occupants in accordance with an aspect of the present disclosure.

Referring to FIGS. 1-7 and 10, reference numeral 10 generally designates a monitoring system for a vehicle 12 in accordance with a first construction. The monitoring system 10A includes at least one imaging device 14 (FIG. 2) configured to capture a first image type 16 and a second image type 18A in a sequence 19A (FIG. 3). A first illumination source 20 is configured to emit a flood illumination 21 captured by the at least one imaging device 14 in the first image type 16 (FIG. 3). A second illumination source 22A is configured to emit an illumination pattern, such as a structured light illumination 24 captured by the at least one imaging device 14 in the second image type 18A (FIG. 3). A control system 100 includes at least one processor 104 that is configured to extract a 2-dimensional ("2D") skeletal representation 26 of a vehicle occupant 28 from the first image type 16, measure a depth of the 2D skeletal representation 26 with the second image type 18A, and extrapolate a 3-dimensional ("3D") skeletal representation 30 of the vehicle occupant 28 (FIGS. 4 and 5).

With reference now to FIGS. 1-3, the components of the monitoring system 10A may be implemented into a variety of structures within the vehicle 12. For example, the at least one imaging device 14 and the first and second illumination sources 20, 22A may be located within a rearview mirror assembly 32 (e.g., a full display rearview mirror assembly), an overhead console 34, the dashboard 36, and/or other locations within an interior cabin 38 of the vehicle 12. In some embodiments, the rearview mirror assembly 32 may include an electro-optic device (not shown). For example, the electro-optic device may be a single-layer component, a single-phase component, a multi-layer component, and/or a multi-phase component that can be switched between a partially transmissive state and a partially reflective state. In some embodiments, the monitoring system 10A may include a communication module 40, for example, a display within the rearview mirror assembly 32, an audio system 39 within the vehicle 12, combinations thereof, and/or the like.

With reference now to FIG. 3, the monitoring system 10A of the first construction may be configured for a first mode of operation under the principles of structured light. In the first mode of operation, the first illumination source 20 is configured to emit the flood illumination 21 substantially within the infrared spectrum. The second illumination source 22A is configured to emit the structured light illumination 24 substantially within the infrared spectrum. In some embodiments, the structured light illumination 24 is distributed as a light spot array with a plurality of light spots 41 (FIG. 4). More particularly, the second illumination source 22A may include a least one laser diode (e.g., a plurality of laser diodes) and an optical lens 42. The optical lens 42 may include a collimation element 44 and a diffractive element 46. The collimation element 44 and the diffractive element 46 may be integrally or separately formed (e.g., via various curvatures, refraction properties, and/or the like within one or more lens 42). In some embodiments, the at least one imaging device 14 includes a single imaging device 14 that captures the first image type 16 and the second image type 18A such that the sequence 19A includes capturing the first image type 16 and the second image type 18A within alternating periods of time as designated by reference numeral 48. The periods of time 48 between capturing the first image type 16 and the second image type 18A may be less than a centisecond, less than 75 milliseconds, between 75 milliseconds and 25 milliseconds, about 50 milliseconds, or less than 50 milliseconds. In this manner, the imaging device 14 may capture a plurality of the first image type 16 and the second image type 18A in accordance with the sequence 19A. However, it should be appreciated that the at least one imaging device 14 may include two or more imaging devices 14 such that the first image type 16 and the second image type 18A are captured simultaneously in the sequence 19A. In some embodiments, 2D information about the occupant 28 may be extracted from the second image type 18A. The control system 100 (e.g., the at least one processor 104) may be configured to process the 2D information about the occupant 28 to detect locations within the second image type 18A that correspond to body parts of interest 25A-25H of the occupant 28 to extract the 2D skeletal representation 26. In this manner, the process of extrapolating the 3D skeletal representation 30 from 2D information and, more particularly, the 2D skeletal representation 26 may be entirely on the basis of the second image type 18A. In this manner, it is contemplated that, the first mode of operation may be completed with only the second image type 18A (e.g., the structured light) such that the first illumination source 20 may be absent or otherwise not utilized for extracting the 2D skeletal representation 26 and, consequently, the 3D skeletal representation 30.

With reference to FIGS. 4 and 5, the first image type 16 includes 2D information about the occupant 28. The control system 100 (e.g., the at least one processor 104) may be configured to process the 2D information about the occupant 28 to detect locations within the first image type 16 that correspond to the body parts of interest 25A-25H of the occupant 28, such as the limbs 25A, head 25B, neck 25C, joints 25D, hands 25E, fingers 25F, feet 25G, and torso 25H. The control system 100 (e.g., the at least one processor 104) may be configured to extract the 2D skeletal representation in accordance with the locations in the first image type 16 of the body parts of interest 25A-25H. The second image type 18A, on the other hand, includes depth information that can be overlaid on the 2D skeletal representation 26. More particularly, under the first mode of operation, the control system 100 (e.g., the at least one processor 104) may be configured to measure a depth of the 2D skeletal representation 26 with the depth information. The depth information may be obtained based on the principles of triangulation and known geometries between imaging device 14, the second illumination source 22A, and the distribution of the structured light illumination 24 (e.g., the light spot array). For example, the processor 104 may be configured to determine movement based on an outer perimeter or a center of gravity of each light spot 41. Under the first mode of operation, the imaging device 14 and the second illumination source 22A may be closely and rigidly fixed on a common optical bench structure (e.g., within the rearview mirror assembly 32 or other shared location interior or exterior of the cabin 38) and, based on the known spacing between the imaging device 14 and the second illumination source 22A (e.g., the laser diodes) and distribution of the structured light illumination 24, the light spot 41 is reflected from the occupant 28 and captured along an epipolar line, which, in turn, can be triangulated to extract a depth of the occupant 28. With reference now to FIG. 5, the depth of the occupant 28 (e.g., the body parts of interest 25A-25H) at each light spot 41 can then be used to extrapolate the 3D skeletal representation 30. Likewise, changes in depth of the body parts of interest 25A-25H can be used to extrapolate the present skeletal posture and movement of the 3D skeletal representation 30. It should be appreciated that, in some embodiments, the monitoring system 10A may not include the first illumination source 20 and the flood illumination 21 may be ambient lighting received from an environment. In this manner, in some embodiments, the at least one imaging device 14 may be configured to capture RGB information (e.g., light captured substantially in the visible spectrum) in the first image type 16 and the 2D skeletal representation 26 can be extracted from the RGB information.

Figure 6D:
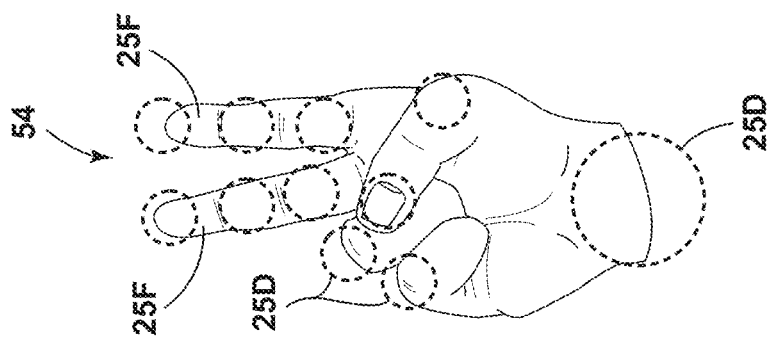
FIG. 6D is a front view of a fourth hand gesture control that is identifiable by a monitoring system in accordance with an aspect of the present disclosure.
Figure 6C:
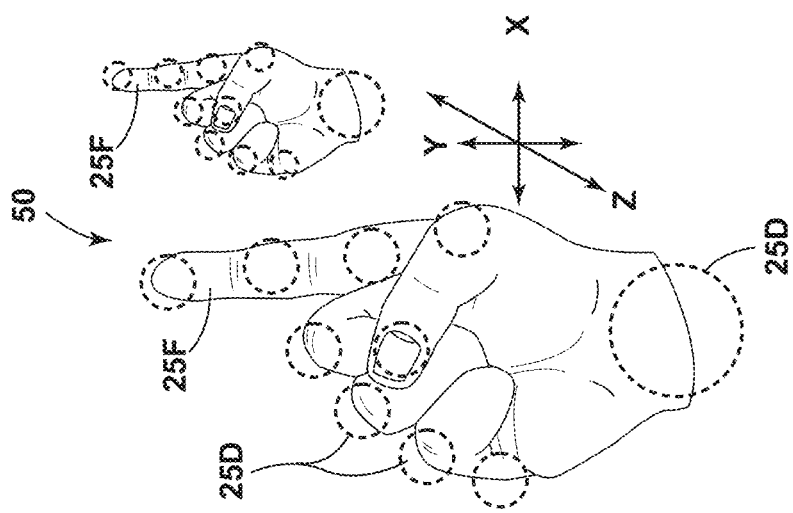
FIG. 6C is a front view of a second hand gesture control that is identifiable by a monitoring system in accordance with an aspect of the present disclosure.
Figure 6B:
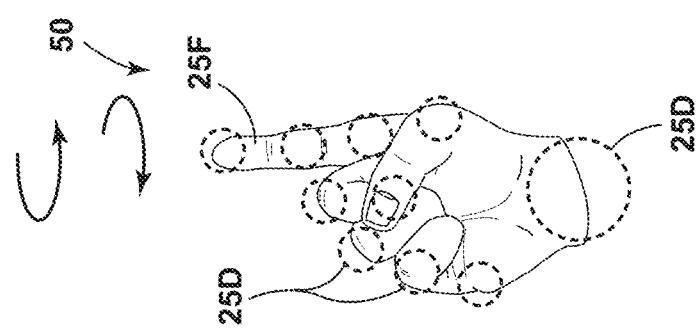
FIG. 6B is a front view of a first hand gesture control that is identifiable by a monitoring system in accordance with an aspect of the present disclosure.
Figure 6A:
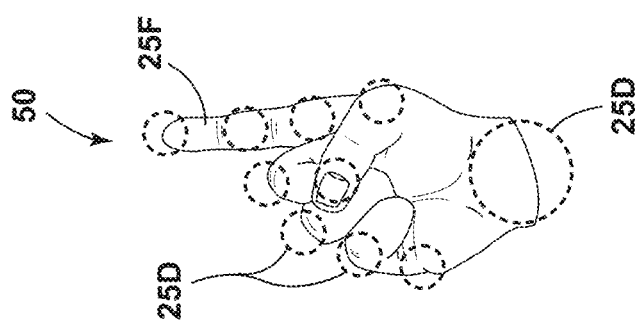
FIG. 6A is a front view of a hand gesture that is identifiable by a monitoring system in accordance with an aspect of the present disclosure.

With reference now to FIG. 6A, the monitoring system 10A may be configured to recognize a position of one of the body parts of interest 25A-25H with the 2D skeletal representation 26 and/or with the 3D skeletal representation 30 in order to control various features of the vehicle 12 via a gesture control functionality. For example, the position may correspond to a hand gesture 50. The hand gesture 50 may include holding one or more fingers 25F in a specific position as articulated by joints 25D. Once the hand gesture 50 is recognized, the control system 100 (e.g., the processor 104) may be configured to generate a menu 55 (FIG. 7) on the communication module 40.

With reference now to FIG. 6B, once the hand gesture 50 is recognized (e.g., and the menu 55 is generated), the control system 100 (e.g., the processor 104) may be configured to recognize circular movement of the hand gesture 50. The circular movement of the hand gesture 50 may correspond to changing a setting within the vehicle 12, for example, the audio system 39 or a heating and cooling system 52 (see FIGS. 1 and 2). The audio system 39 may have settings that include radio channels, speaker volume, device pairing, and receiving or sending calls that can be controlled by moving the hand gesture 50. The heating and cooling system 52 may have settings that include raising and lowering temperatures that can be controlled by moving the hand gesture 50. The circular movement of the hand gesture 50 may correspond to at least one of cycling menu options, selecting a menu option, or changing a setting within the vehicle 12. In some embodiments, circular movement in a first direction (e.g., a clockwise direction) corresponds to a different setting adjustment than circular movement in a second direction (e.g., a counterclockwise direction). For example, circular movement in the first direction may correspond to at least one of cycling menu options in a first direction (e.g., left to right) and increasing a setting within the vehicle 12, whereas circular movement in the second direction may correspond to at least one of cycling menu options in a second direction (e.g., right to left) and decreasing a setting within the vehicle 12.

With reference now to FIG. 6C, once the hand gesture 50 is recognized (e.g., and the menu 55 is generated), the control system 100 (e.g., the processor 104) may be configured to recognize other types of movement of the hand gesture 50. For example, movement of the hand gesture 50 along an axis (e.g., an X-axis, Y-axis, or Z-axis) in a 3D space may correspond to changing the setting within the vehicle 12, for example, the audio system 39 or the heating and cooling system 52 (see FIGS. 1 and 2). The movement of the hand gesture 50 may correspond to at least one of cycling menu options, selecting a menu option, or changing a setting within the vehicle 12. In some embodiments, movement in a first direction corresponds to a different setting adjustment than movement in a second direction. For example, movement in the first direction may correspond to at least one of cycling menu options in a first direction (e.g., left to right) and increasing a setting within the vehicle 12, whereas movement in the second direction may correspond to at least one of cycling menu options in a second direction (e.g., right to left) and decreasing a setting within the vehicle 12. In some embodiments, movement generally towards the imaging device 14 corresponds to selecting a menu option, and movement generally away from the imaging device 14 corresponds to deselecting a menu option. In some embodiments, horizontal movement (e.g., along the X-axis) corresponds to cycling menu options. In some embodiments, vertical movement corresponds to increasing or decreasing a setting of the vehicle 12 (e.g., temperature or volume).

With reference now to FIG. 6D, once the hand gesture 50 is recognized (e.g., and the menu 55 is generated), the control system 100 (e.g., the processor 104) may be configured to recognize other types of subsequent hand gestures 54. For example, movement of an additional finger 25F may correspond to changing the setting within the vehicle 12, for example, the audio system 39 or the heating and cooling system 52 (see FIGS. 1 and 2). The subsequent hand gestures 54 may correspond to at least one of cycling menu options, selecting a menu option, or changing a setting within the vehicle 12.

Figure 7:
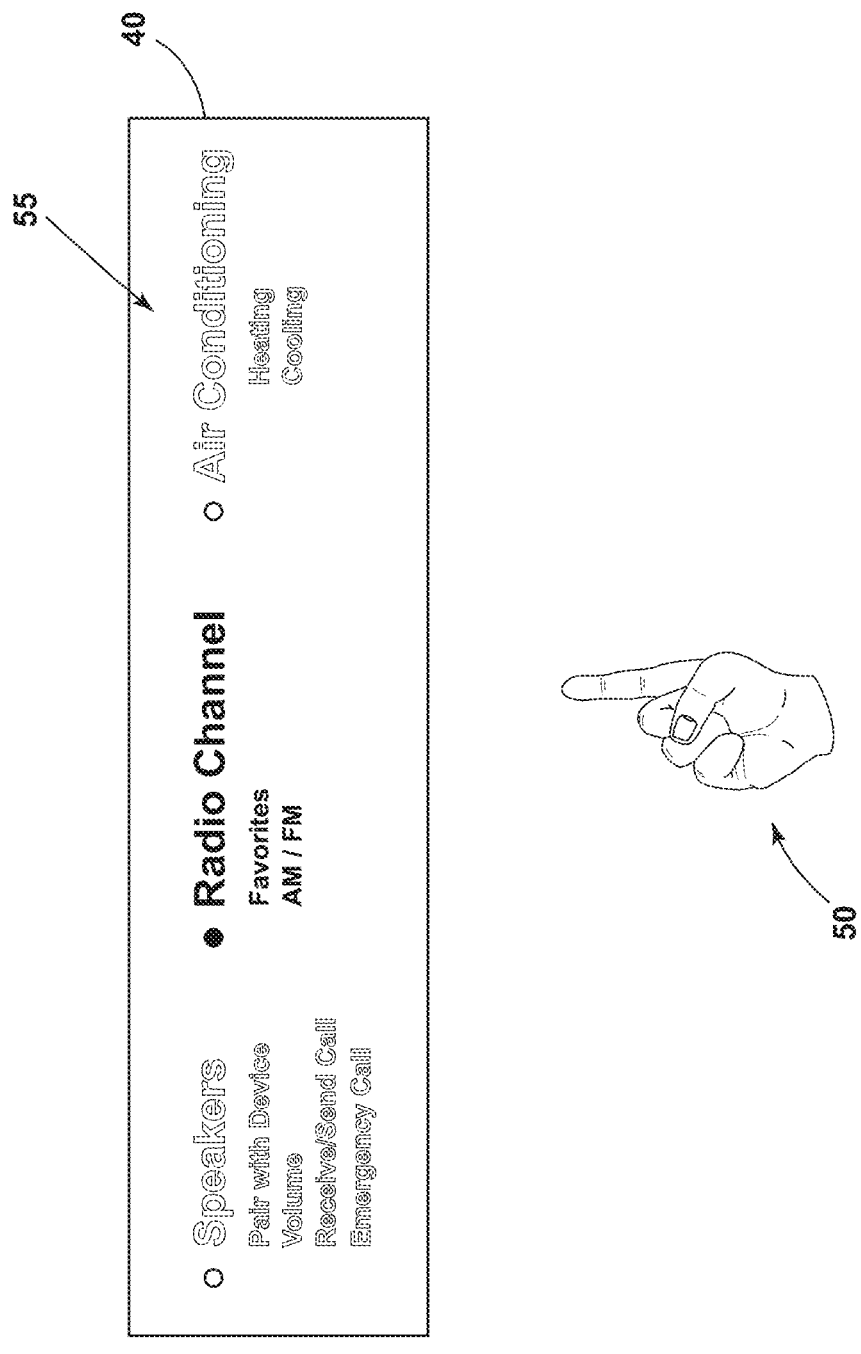
FIG. 7 is a schematic view of an operating menu in accordance with an aspect of the present disclosure.

With reference now to FIGS. 6A-6D, the monitoring system 10A may be configured to recognize a position other the body parts of interest 25A-25H or other hand gestures not explicitly shown with the 2D skeletal representation 26 and/or with the 3D skeletal representation 30 in order to control the features of the vehicle 12. In addition, it should be appreciated that controlling the features of the vehicle 12 may be established without interfacing with the menu 55. For example, receiving a call, changing a temperature setting, or controlling the audio system 39 may be established without the menu 55. With reference now to FIG. 7, in some embodiments, once the hand gesture 50 is recognized, the menu 55 may provide a prompt to establish the gesture control that can be selected based on movement of the body parts of interest 25A-25H and/or holding the gesture for a predetermined amount of time. In some embodiments, a certain hand gesture 50 may correspond with requesting an emergency response.

With continued reference to FIGS. 6A-6D, the movement of the hand gesture 50 may correspond to at least one of cycling menu options, selecting a menu option, or changing a setting within the vehicle 12. Stated another way, a first type of movement may correspond to open main menu 55, a second type of movement may correspond to scrolling through settings, a third movement type may correspond to selecting a setting and/or opening a sub-menu, a fourth movement type may correspond to adjusting the setting, and a fifth movement type may correspond to a "back" input that returns to the main menu. The movement types may correspond to an entire hand 25E, fingers 25F, and/or combinations thereof. The movement types may be generally distinguished by the pattern of movement (e.g., circular, back-and-forth), the direction of movement (e.g., towards, away, vertically, horizontally, clockwise, counterclockwise, other recognizable patterns, and/or the like), position of an individual finger 25F, a position of a combination of two or more fingers 25F, combinations thereof, and/or the like. In addition, it should be appreciated that the menu 55 on the communication module 40 may be obtainable and usable via traditional means in addition to the recognized movements.

For example, the monitoring system 10A (e.g., the menu 55 on the communications module) may include a user interface that includes a plurality of physical user inputs for operating the menu 55. In some embodiments, an option to utilize the recognized movements to operate the menu 55 may need to be selected either once, every time a vehicle is operated, and/or every time the menu 55 is accessed. However, in other embodiments, the menu 55 may be accessed without utilizing any physical inputs. These operations of the menu 55 are controlled by the control system 100 (e.g., the processor 104), which is configured to perform and/or generate a signal to command all the steps and functions described herein.

With reference back to FIGS. 1 and 2, the 3D skeletal representation 30 of the vehicle occupant 28 provides the monitoring system 10A absolute scale information about the vehicle occupant 28. In other words, traditional 2D modeling systems may have complications obtaining absolute scale as a result of forced perspectives from 2D images that cause closer objects to appear larger than reality. In this manner, precise positioning of the 3D skeletal representation 30 within the interior cabin 38 can be determined to facilitate additional functionalities of the monitoring system 10A, such as detecting the different types of movement of the hand gesture 50. For example, the control system 100 (e.g., the processor 104) may be configured to determine the precise location of the vehicle occupant 28 relative to structures within the vehicle 12. The location of the other structures in the vehicle 12 may be pre-saved and/or measured via the second image type 18A. In one example, rather than relying on 2D information, the control system 100 (e.g., the processor 104) can determine if the vehicle occupant 28 is leaning against a seatback 53 (FIG. 1). In another example, the control system 100 (e.g., the processor 104) can determine if the vehicle occupant 28 is gripping a steering wheel 56 rather than simply holding their hands 25E between the steering wheel 56 and imaging device 14. In yet another example, the control system 100 (e.g., the processor 104) can determine a distance the vehicle occupant 28 (e.g., the head 25B, neck 25C, or torso 25H) is from an airbag deployment surface 58 of an airbag assembly 60. In this manner, the control system 100 (e.g., the processor 104) may be configured to deploy the airbag assembly 60 when the vehicle occupant 28 is a predetermined distance "D" from the airbag deployment surface 58. For example, the control system 100 (e.g., the processor 104) may be configured to determine that the airbag assembly 60 is needed for the vehicle occupant 28 (e.g., by sudden movement of the vehicle occupant 28 or based on one or more vehicular sensors) and, upon determining that the airbag assembly 60 is needed (e.g., from a crash event), deploy the airbag assembly 60 once the vehicle occupant 28 reaches the predetermined distance D from the airbag deployment surface 58.

With continued reference back to FIGS. 1 and 2, the control system 100 (e.g., the processor 104) can determine a distance the hands 25E or fingers 25F is from the first imaging device 14, other imaging devices (e.g., imaging device 64), or illumination sources 20, 22A, 22B, and compare that distance with the predetermined distance. Therefore, the predetermined distance "D" may correspond to a threshold distance where the control system 100 (e.g., the processor 104) recognizes the hand gesture 50 as intentional. For example, in some scenarios, the control system 100 (e.g., the processor 104) may require that the hands 25E or fingers 25F are within the threshold distance prior to generating the menu 55. In this manner, movement of the hands 25E and/or fingers 25F related to other operations of the vehicle 12 (manually adjusting systems without the hand gesture 55, steering, turn signals, etc.) or other movement during travel (e.g., eating food, drinking, adjusting glasses, fixing hair, etc.) can be distinguished and disregarded. In some embodiments, the threshold distance is less than 3 ft, for example, less than 2 ft, less than 1 ft, or less than 6 in. Further, the control system 100 (e.g., the processor 104) may be configured to distinguish between left and right hands 25E. Therefore, in some embodiments, the control system 100 (e.g., the processor 104) may be configured, or an option may be selected, to only recognize hand gestures 50 from the right hand 25E, the left hand 25E, or both the left and right hands 25E. In some embodiments, the control system 100 (e.g., the processor 104) may be configured to require whichever hand 25E is closest to the first imaging device 14, other imaging devices (e.g., imaging device 64), or illumination sources 20, 22A, 22B to recognize the hand gesture 50. For example, depending on the jurisdiction, a driver seat may be positioned to the left or the right of the first imaging device 14, other imaging devices (e.g., imaging device 64), or illumination sources 20, 22A, 22B, particularly when those features are implemented in the rearview mirror assembly 32, the overhead console 34, or the dashboard 36.

Figure 8:
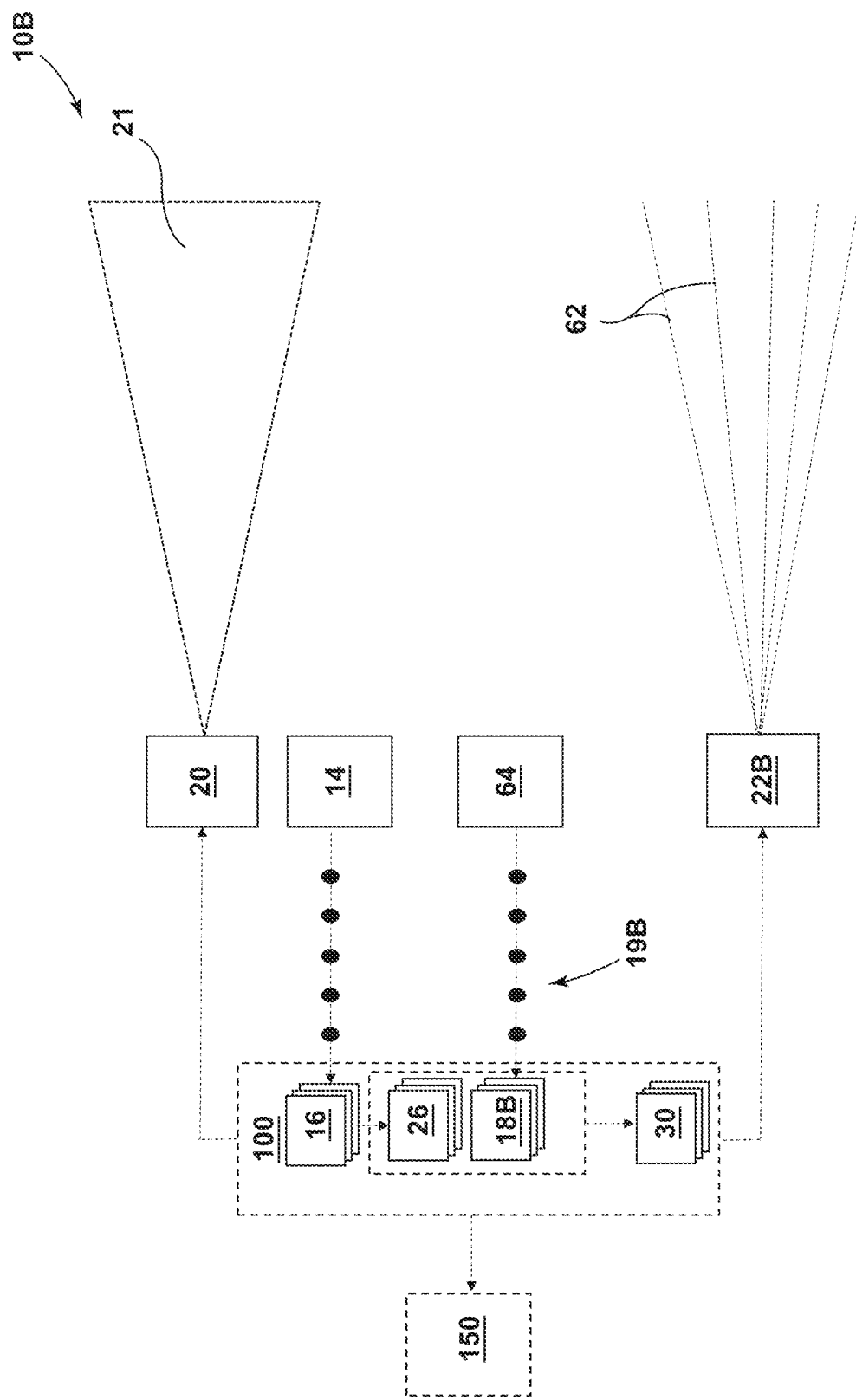
FIG. 8 is a schematic view of a monitoring system including a second construction in accordance with an aspect of the present disclosure.

With reference now to FIG. 8, a monitoring system 10B of a second construction may be configured for a second mode of operation under the principles of Time-of-Flight ("ToF"). Unless otherwise explicitly indicated, the monitoring system 10B may include all the components, functions, materials, and may be implemented in the same structures of the vehicle 12 as the other constructions. However, the monitoring system 10B may include a second illumination source 22B (e.g., at least one laser diode and/or LED) that is configured to emit an illumination pattern, such as a beam illumination 62 (in modulated pulses or continuously emitted). The monitoring system 10B includes at least one imaging device that includes a first imaging device 14 and a second imaging device 64 (e.g., a sensor). The first imaging device 14 is configured to capture the flood illumination 21 from the first illumination source 20 in the first image type 16, and the second imaging device 64 is configured to capture the beam illumination 62 in a second image type 18B. The control system 100 (e.g., the at least one processor 104) is configured to extract the 2D skeletal representation 26 of the vehicle occupant 28 from the first image type 16, measure a depth of the 2D skeletal representation 26 with the second image type 18B, and extrapolate the 3D skeletal representation 30 of the vehicle occupant 28. In some embodiments, the monitoring system 10B may further be configured to capture a 2D image of the interior cabin 38 (e.g., the occupant). For example, the first imaging device 14 and/or the second imaging device 64 may be configured to capture the 2D. In this manner, the processor 104 may be configured to extract the 2D skeletal representation from the 2D image rather than requiring additional sensors.

Figure 9:
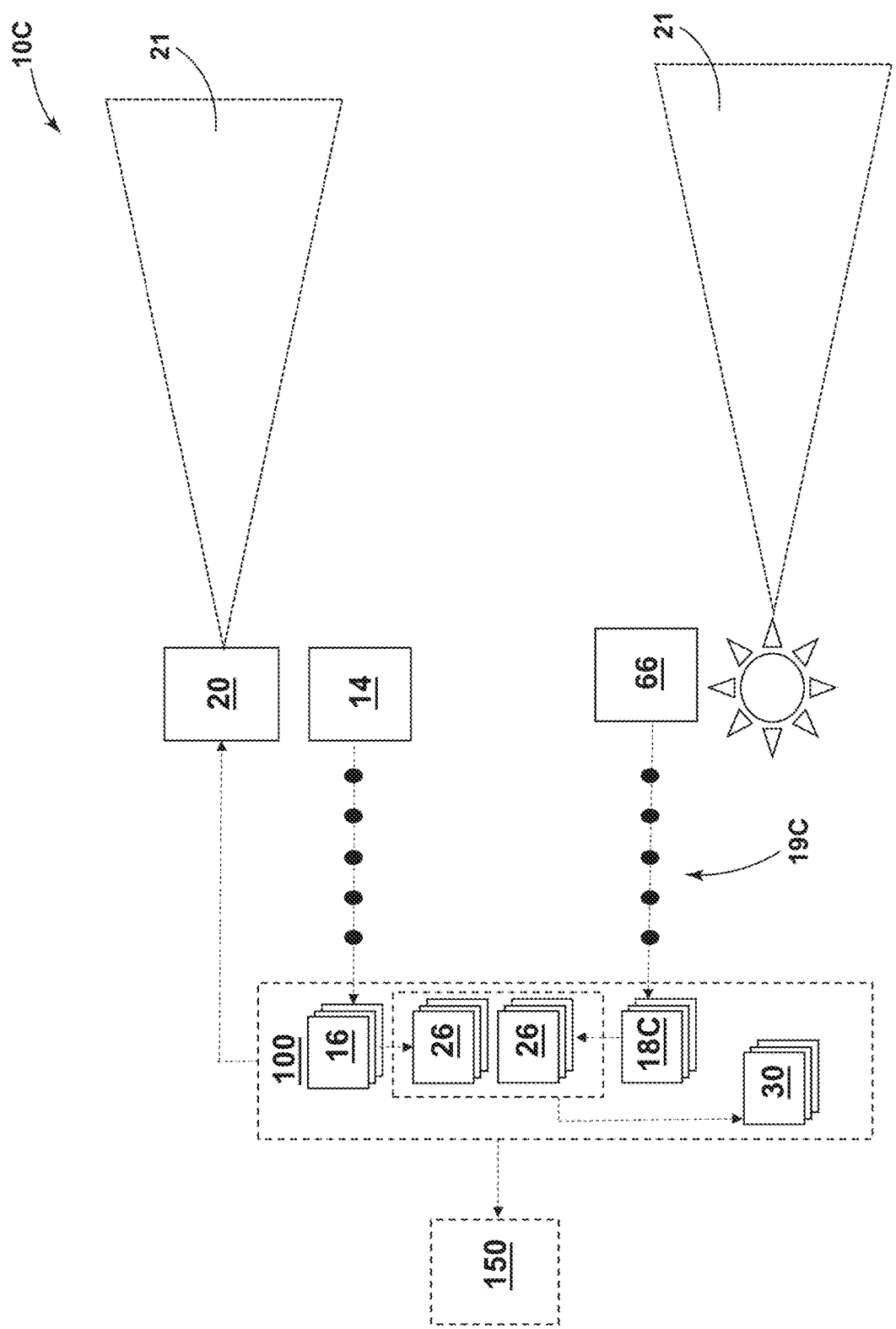
FIG. 9 is a schematic view of a monitoring system including a third construction in accordance with an aspect of the present disclosure.

With continued reference to FIG. 8, the control system 100 (e.g., the at least one processor 104) may be configured to extract the 2D skeletal representation in accordance with the locations in the first image type 16 of the body parts of interest 25A-25H. The second image type 18B, on the other hand, includes depth information that can be overlaid on the 2D skeletal representation 26. More particularly, under the second mode of operation, the control system 100 (e.g., the at least one processor 104) may be configured to measure a depth of the 2D skeletal representation 26 with the depth information. The depth information may be obtained based on the principles of a time difference between the emission of the beam illumination 62 in modulated pulses and the return of the beam illumination 62 back to the second imaging device 64, after being reflected from the vehicle occupant 28 (or other structure within the vehicle). The depth information may also be obtained by measuring the phase shift of the emission of the beam illumination 62 in continuous emission. In this manner, the first imaging device 14 and the second imaging device 64 may capture the first image type 16 and the second image type 18B simultaneously in a sequence 19B. It should be appreciated that in some embodiments, the monitoring system 10B may not include the first illumination source 20 and the flood illumination 21 may be ambient lighting received from an environment. With reference now to FIG. 9, a monitoring system 10C of a third construction may be configured for a third mode of operation under the principles of stereo vision. Unless otherwise explicitly indicated, the monitoring system 10C may include all the components, functions, materials, and may be implemented in the same structures of the vehicle 12 as the other constructions. However, the monitoring system 10C may include only the first illumination source 20 and the at least one imaging device may include a first imaging device 14 and a second imaging device 66 that are both configured to capture the flood illumination 21. More particularly, the first imaging device 14 is configured to capture the first image type 16 and the second imaging device 66 is configured to capture a second image type 18C that is different from the first image type 16 in orientation. In this manner, the control system 100 (e.g., the at least one processor 104) may be configured to extract first and second orientations of the 2D skeletal representation 26 in accordance with the locations in the first image type 16 and the second image type 18C of the body parts of interest 25A-25H. More particularly, under the third mode of operation, the control system 100 (e.g., the at least one processor 104) may be configured to obtain depth information of the 2D skeletal representation 26 by measuring the position of the 2D skeletal representation 26 in the first image type 16 against the position of the 2D skeletal representation 26 in the second image type 18C along epipolar lines. The depth information may be obtained based on the principles of triangulation and known geometries between first imaging device 14 and the second imaging device 66 to extrapolate the 3D skeletal representation 30. In this manner, the first imaging device 14 and the second imaging device 64 may capture the first image type 16 and the second image type 18C simultaneously in a sequence 19C. It should be appreciated that in some embodiments, the monitoring system 10C may not include the first illumination source 20 and the flood illumination 21 may be ambient lighting received from an environment.

Figure 10:
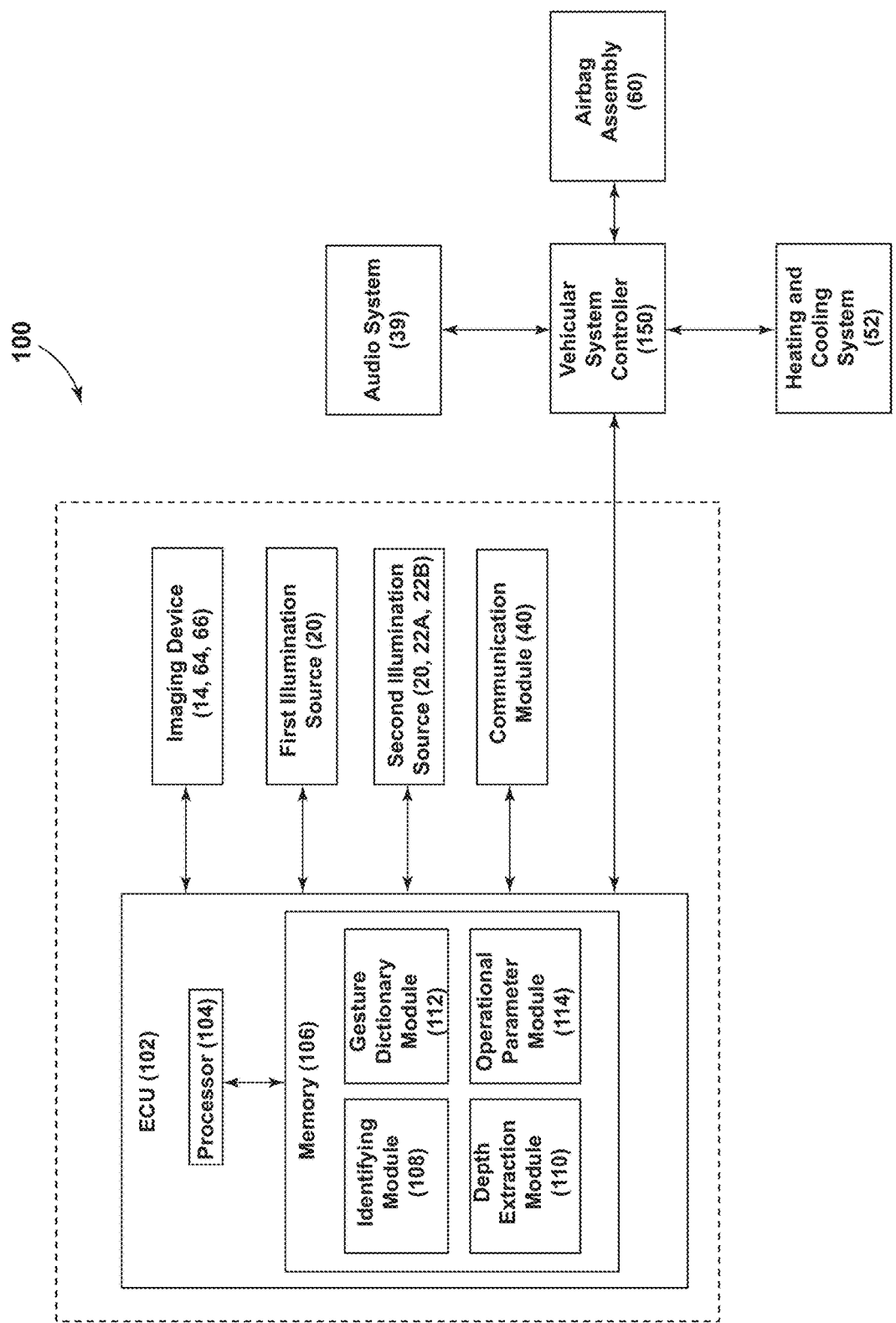
FIG. 10 is schematic view of a control system that controls functionalities of a monitoring system in accordance with an aspect of the present disclosure.

With reference now to FIG. 10, the control system 100 of the monitoring system 10A-10C may include at least one electronic control unit (ECU) 102. The at least one ECU 102 may be located in rearview mirror assembly 32 and/or other structures in the vehicle 12. In some embodiments, components of the ECU 102 are located in both the rearview mirror assembly 32 and other structures in the vehicle 12. The at least one ECU 102 may include the processor 104 and a memory 106. The processor 104 may include any suitable processor 104. Additionally, or alternatively, each ECU 102 may include any suitable number of processors, in addition to or other than the processor 104. The memory 106 may comprise a single disk or a plurality of disks (e.g., hard drives) and includes a storage management module that manages one or more partitions within the memory 106. In some embodiments, memory 106 may include flash memory, semiconductor (solid state) memory, or the like. The memory 106 may include Random Access Memory (RAM), a Read-Only Memory (ROM), Electrically Erasable Programmable Read-Only Memory (EEPROM), or a combination thereof. The memory 106 may include instructions that, when executed by the processor 104, cause the processor 104 to, at least, perform the functions associated with the components of the monitoring system 10A-10C. The at least one imaging device (e.g., 14, 64, 66), the first illumination source 20, the second illumination source 22A-22B, and the communication module 40 may, therefore, be controlled by the control system 100. The memory 106 may, therefore, include a series of captured first images 16, a series of second image types 18A-18C, a body part identifying module 108, a depth extraction module 110, a gesture identifier dictionary module 112, and operational parameter module 114. The vehicle 12 may also include one or more vehicular system controllers 150 communicating with the control system 100.

With reference now to FIGS. 1-10, the monitoring system 10A-10C includes the at least one imaging device (e.g., 14, 64, 66) configured to capture the first image type 16 and the second image type 18A-18C. The monitoring system 10A-10C includes a control system 100 that extracts a 2D skeletal representation 26 from the first image type 16 and/or the second image type (18A-18C). For example, the body part identifying module 108 may include instructions for the processor 104 to detect locations within the first image type 16 and/or the second image type (18A-18C) that correspond to the body parts of interest 25A-25H of a vehicle occupant 28. Depth information about the 2D skeletal representation 26 can be obtained by comparing the first image type 16 and the second image type 18A-18C to extrapolate a 3D skeletal representation 30. For example, the depth extraction module 110 may include instructions for the processor 104 to determine the depth information on the basis of the principles of structured light (monitoring system 10A), ToF (monitoring system 10B), stereo vision (monitoring system 10C), or other depth calculating principles. Changes to the 3D skeletal representation 30 can be measured to obtain a present skeletal posture and movement of the 3D skeletal representation 30 in absolute scale. The 3D skeletal representation 30 may be monitored by instructions from the gesture identifier dictionary module 112 to the processor 104 that include a plurality of present and/or reconfigurable gestures and gesture commands to operate setting within the vehicle 12. The processor 104 may be configured to communicate the gesture commands to the one or more vehicular system controllers 150. The 3D skeletal representation 30 may be monitored to ensure contact with the seatback 53, hand 25E placement on the steering wheel 56, and distance between the airbag deployment surface 58 and the vehicle occupant 28. For example, the operational parameter module 114 may include instructions for the processor 104 to generate a notification to the vehicle occupant 28 as a result of improper hand 25E placement (e.g., the communication module 40). The operational parameter module 114 may, likewise, include instructions for the processor 104 to determine that the airbag assembly 60 is needed for the vehicle occupant 28 and, upon determining that the airbag assembly 60 is needed, deploy the airbag assembly 60 once the vehicle occupant 28 reaches the predetermined distance D from the airbag deployment surface 58. In some embodiments, the processor 104 may communicate with the one or more vehicular system controllers 150 to determine that the airbag assembly 60 is needed and generate an instruction to the one or more vehicular system controllers 150 to deploy the airbag assembly 60.

With continued reference to FIGS. 1-10, the control system 100 may be further configured to extract the 2D skeleton representation 26 and/or the 3D skeletal representation 30 by employing machine learning models. In this manner, the monitoring system 10A-10C and, more particularly, the control system 100 may be configured to automatically adapt the processes described herein to improve accuracy of the 2D skeletal representation 26 and the 3D skeletal representation 30. For example, the memory 106 may include machine learning algorithms, for example, deep learning, machine learning algorithms, tracking algorithms, and/or the like. More particularly, the control system 100 (e.g., the at least one processor 104) may be configured to modify parameters over continued usage when extracting the 2D skeletal representation 26 and extrapolate the 3D skeletal representation of the vehicle occupant 28. In some embodiments, derived insights from the hand gesture 50 may also be facilitated by employing machine learning models. For example, if the hand gesture 50 is identified but not specifically recognized for menu control 55, the control system 100 (e.g., the at least one processor 104) may be configured to modify the recognition parameters. In this manner, the control system 100 (e.g., the at least one processor 104) may accurately obtain information (e.g., and control the menu 50) from occupants 28 with different hands 25E (e.g., digit length, missing digits, joint flexibility), arm length, or number of usable hands 25E. Similar methods may be applied to other functionalities of the monitoring system 10A-10C to improve accuracy and redefine parameters for occupants 28 of different sizes, shapes, medical conditions, and/or the like.

With still continued reference to FIGS. 1-10, the control system 100 (e.g., the processor 104) may receive instructions from the body part identifying module 108 to extrapolate and/or otherwise determine a user's hands 25E (e.g., distinguish between the left and right hands 25E) and fingers 25F (e.g., distinguish between one or more fingers). The control system 100 (e.g., the processor 104) may further receive instructions from depth extraction module 110 to extrapolate and/or otherwise determine if the hand 25E or finger 25F is within the threshold distance, where if the hand 25E or finger 25F is outside of the threshold distance, any gesture recognition is either discarded or utilized by the machine learning protocols. If the hand 25E or finger 25F is within the threshold distance, the control system 100 (e.g., the processor 104) may further receive instructions from the gesture identifier dictionary module 112 to identify the hand gestures 50 and the various movements to generate and operate the menu 55. The operational parameter module 114 may include options, such as adjusting the threshold distance, if the left, right, or both hands 25E are preferred, modifications, deletions, or additions to hand gestures 50 saved in the gesture identifier dictionary module 112, combinations thereof, and/or the like. In some embodiments, the operational parameter module 114 may further include the option to save profiles, such that two or more individuals can have preferred settings saved in the memory 106 and selectable via the menu 55.

The disclosure herein is further summarized in the following paragraphs and is further characterized by combinations of any and all of the various aspects described therein.

According to one aspect of the present disclosure, a monitoring system for a vehicle includes at least one imaging device configured to capture a first image type and a second image type in a sequence. A first illumination source is configured to emit a flood illumination captured by the at least one imaging device in the first image type. A second illumination source is configured to emit an illumination pattern captured by the at least one imaging device in the second image type. At least one processor is configured to extract a 2-dimensional ("2D") skeletal representation of a vehicle occupant from the first image type, measure a depth of the 2D skeletal representation with the second image type, and extrapolate a 3-dimensional ("3D") skeletal representation of the vehicle occupant.

According to another aspect, a flood illumination and an illumination pattern are substantially within an infrared spectrum.

According to yet another aspect, a flood illumination is substantially within a visible spectrum and an illumination pattern is substantially within an infrared spectrum.

According to still yet another aspect, at least one processor is configured to detect that an airbag is needed because of a crash event, determine a distance of a 3D skeletal representation from an airbag deployment surface, and generate an instruction to deploy the airbag from the airbag deployment surface at a predetermined distance between the 3D skeletal representation and the airbag deployment surface.

According to another aspect, at least one processor is configured to detect when a hand of a 3D skeletal representation of an occupant is in a gesture position, recognize a hand gesture of the hand, and control a setting of a vehicle in accordance with the hand gesture.

According to yet another aspect, at least one processor is configured to recognize a hand gesture as a movement of a hand in a direction, and distinguish the movement of the hand in the direction from a plurality of directions, each direction of the plurality of directions corresponding to a different control setting.

According to still yet another aspect, at least one processor is configured to recognize a hand gesture as a movement of a hand in a pattern, and distinguish the pattern from a plurality of patterns, each pattern of the plurality of patterns corresponding to a different control setting.

According to another aspect, at least one processor is configured to recognize a position of at least one finger on a hand as a hand gesture, and control a setting of a vehicle in accordance with the position of the at least one finger.

According to yet another aspect, the position of the at least one finger includes a position of at least two fingers.

According to still yet another aspect, a gesture position is within a threshold distance from at least one imaging device.

According to another aspect, a depth information in a second image type is obtained under principles of at least one of time-of-flight or structured light.

According to another aspect of the present disclosure, a monitoring system for a vehicle includes at least one imaging device configured to capture a first image type and a second image type. The first image type includes a 2-dimensional ("2D") capture of a flood illumination on a vehicle occupant. The second image type includes a depth information of the vehicle occupant. At least one processor is configured to extract a 2-dimensional ("2D") skeletal representation of a vehicle occupant from the first image type, measure a depth of the 2D skeletal representation with the depth information, and extrapolate a 3-dimensional ("3D") skeletal representation of the vehicle occupant. The at least one processor is further configured to detect when a hand of the 3D skeletal representation of the vehicle occupant is in a gesture position, recognize a first hand gesture of the hand, and generate a menu in accordance with the first hand gesture.

According to another aspect, at least one processor is configured to recognize a second hand gesture of a hand after a menu has been generated, and scroll through a plurality of settings on the menu in accordance with a second hand gesture.

According to yet another aspect, a second hand gesture is different than a first hand gesture and corresponds to movement of a hand in one of a first direction or a first pattern.

According to still yet another aspect, at least one processor is configured to recognize a third hand gesture of a hand after a plurality of settings have been scrolled to a desired setting, and select the desired setting on a menu in accordance with a third hand gesture.

According to another aspect, a first hand gesture, a second hand gesture, and a third hand gesture are different.

According to yet another aspect, a menu is generated on a full display rearview mirror assembly.

According to still yet another aspect, a depth information in a second image type is obtained under principles of at least one of time-of-flight, stereo vision, or structured light.

According to yet another aspect of the present disclosure, a monitoring system for a vehicle includes at least one imaging device configured to capture a first image type and a second image type. The first image type includes a 2-dimensional ("2D") capture of a flood illumination on a vehicle occupant. The second image type includes a depth information of the vehicle occupant. At least one processor is configured to extract a 2-dimensional ("2D") skeletal representation of a vehicle occupant from the first image type, measure a depth of the 2D skeletal representation with the depth information, and extrapolate a 3-dimensional ("3D") skeletal representation of the vehicle occupant. The at least one processor is further configured to detect when a hand of the 3D skeletal representation of the vehicle occupant is in a gesture position within a threshold distance of the at least one imaging device, recognize a first hand gesture of the hand, and generate a menu on a full display rearview mirror assembly in accordance with the first hand gesture.

According to another aspect, a depth information in a second image type is obtained under principles of at least one of time-of-flight, stereo vision, or structured light.

It will be understood by one having ordinary skill in the art that constructions of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A monitoring system for a vehicle comprising:
   at least one imaging device configured to capture a first image type and a second image type in a sequence;
   a first illumination source configured to emit a flood illumination captured by the at least one imaging device in the first image type;
   a second illumination source configured to emit an illumination pattern captured by the at least one imaging device in the second image type; and
   at least one processor configured to:
      extract a 2-dimensional ("2D") skeletal representation of a vehicle occupant from the first image type;
      measure a depth of the 2D skeletal representation with the second image type; and
      extrapolate a 3-dimensional ("3D") skeletal representation of the vehicle occupant.

2. The monitoring system of claim 1, wherein the flood illumination and the illumination pattern are substantially within an infrared spectrum.

3. The monitoring system of claim 1, wherein the flood illumination is substantially within a visible spectrum and the illumination pattern is substantially within an infrared spectrum.

4. The monitoring system of claim 1, wherein the at least one processor is further configured to:
   detect that an airbag is needed because of a crash event;
   determine a distance of the 3D skeletal representation from an airbag deployment surface; and
   generate an instruction to deploy the airbag from the airbag deployment surface at a predetermined distance between the 3D skeletal representation and the airbag deployment surface.

5. The monitoring system of claim 1, wherein the at least one processor is further configured to:
   detect when a hand of the 3D skeletal representation of the vehicle occupant is in a gesture position;
   recognize a hand gesture of the hand; and
   control a setting of the vehicle in accordance with the hand gesture.

6. The monitoring system of claim 5, wherein the at least one processor is further configured to:
   recognize the hand gesture as a movement of the hand in a direction; and
   distinguish the movement of the hand in the direction from a plurality of directions, each direction of the plurality of directions corresponding to a different control setting.

7. The monitoring system of claim 5, wherein the at least one processor is further configured to:
   recognize the hand gesture as a movement of the hand in a pattern; and
   distinguish the pattern from a plurality of patterns, each pattern of the plurality of patterns corresponding to a different control setting.

8. The monitoring system of claim 5, wherein the at least one processor is further configured to:
   recognize a position of at least one finger on the hand as the hand gesture; and
   control a setting of the vehicle in accordance with the position of the at least one finger.

9. The monitoring system of claim 8, wherein the position of the at least one finger includes a position of at least two fingers.

10. The monitoring system of claim 5, wherein the gesture position is within a threshold distance from the at least one imaging device.

11. The monitoring system of claim 1, wherein the depth in the second image type is obtained under the principles of at least one of time-of-flight or structured light.

12. A monitoring system for a vehicle comprising:
    at least one imaging device configured to capture a first image type and a second image type;
    the first image type including a 2-dimensional ("2D") capture of a flood illumination on a vehicle occupant;
    the second image type including depth information of the vehicle occupant; and
    at least one processor configured to:
       extract a 2-dimensional ("2D") skeletal representation of a vehicle occupant from the first image type;
       measure a depth of the 2D skeletal representation with the depth information;
       extrapolate a 3-dimensional ("3D") skeletal representation of the vehicle occupant;
       detect when a hand of the 3D skeletal representation of the vehicle occupant is in a gesture position;
       recognize a first hand gesture of the hand; and
       generate a menu in accordance with the first hand gesture.

13. The monitoring system of claim 12, wherein the at least one processor is further configured to:
    recognize a second hand gesture of the hand after the menu has been generated; and
    scroll through a plurality of settings on the menu in accordance with the second hand gesture.

14. The monitoring system of claim 13, wherein the second hand gesture is different than the first hand gesture and corresponds to movement of the hand in one of a first direction or a first pattern.

15. The monitoring system of claim 13, wherein the at least one processor is further configured to:
    recognize a third hand gesture of the hand after the plurality of settings have been scrolled to a desired setting; and
    select the desired setting on the menu in accordance with the third hand gesture.

16. The monitoring system of claim 15, wherein the first hand gesture, the second hand gesture, and the third hand gesture are different.

17. The monitoring system of claim 15, wherein the menu is generated on a full display rearview mirror assembly.

18. The monitoring system of claim 15, wherein the depth information in the second image type is obtained under the principles of at least one of time-of-flight, stereo vision, or structured light.

19. A monitoring system for a vehicle comprising:
    at least one imaging device configured to capture a first image type and a second image type;
    the first image type including a 2-dimensional ("2D") capture of a flood illumination on a vehicle occupant;

the second image type including depth information of the vehicle occupant; and at least one processor configured to:
- extract a 2-dimensional ("2D") skeletal representation of a vehicle occupant from the first image type;
- measure a depth of the 2D skeletal representation with the depth information;
- extrapolate a 3-dimensional ("3D") skeletal representation of the vehicle occupant;

detect when a hand of the 3D skeletal representation of the vehicle occupant is in a gesture position within a threshold distance of the at least one imaging device;

recognize a first hand gesture of the hand; and generate a menu on a full display rearview mirror assembly in accordance with the first hand gesture.

20. The monitoring system of claim 19, wherein the depth information in the second image type is obtained under the principles of at least one of time-of-flight, stereo vision, or structured light.

* * * * *